US009937852B2

(12) United States Patent
Adams et al.

(10) Patent No.: US 9,937,852 B2
(45) Date of Patent: Apr. 10, 2018

(54) LIGHT FIXTURE WITH CURVED FRAME (71) Applicant: JST Performance, LLC, Gilbert, AZ (US)

(72) Inventors: Stephen P. Adams, Mesa, AZ (US); Pete D. Sibitzky, Lakeside, CA (US)

(73) Assignee: JST Performance, LLC, Gilbert, AZ (US)

( * ) Notice: Subject to any disclaimer, the term of this patent is extended or adjusted under 35 U.S.C. 154(b) by 0 days.

(21) Appl. No.: 14/071,399

(22) Filed: Nov. 4, 2013

(65) Prior Publication Data
US 2014/0078762 A1 Mar. 20, 2014

Related U.S. Application Data (63) Continuation-in-part of application No. 13/741,307, filed on Jan. 14, 2013, now Pat. No. 8,979,303.

(Continued)

(51) Int. Cl.
B60Q 1/28 (2006.01)
B60Q 1/18 (2006.01)
(Continued)

(52) U.S. Cl.
CPC .............. B60Q 1/18 (2013.01); B60Q 1/0035 (2013.01); B60Q 1/0483 (2013.01); B60Q 1/06 (2013.01); B60Q 1/2619 (2013.01); B60Q 1/2661 (2013.01); B60Q 1/28 (2013.01); F21S 48/1104 (2013.01); F21S 48/115 (2013.01); F21S 48/211 (2013.01); F21S 48/215 (2013.01); F21S 48/328 (2013.01); F21V 15/013 (2013.01); F21V 21/30 (2013.01); F21V 29/507 (2015.01); F21V 29/75 (2015.01); F21V 29/76 (2015.01); F21Y 2115/10 (2016.08)

(58) Field of Classification Search
CPC . B60Q 1/28; B60Q 1/442; B60Q 1/02; B60Q 1/26; B60Q 1/46; B60Q 1/503; B60Q 1/2607; B60Q 1/2619; B60Q 1/0035; B60Q 1/2696; B60R 2019/525; B60R 19/52; F21Y 2101/02; F21Y 2105/001; F21Y 2111/001; F21Y 2103/10; F21S 48/1154; F21S 48/215; F21S 48/115; F21S 48/24; F21S 48/30; G09F 2013/0472; G09F 9/301; G09F 7/18; G09F 21/04; G09F 21/00
See application file for complete search history.

(56) References Cited

U.S. PATENT DOCUMENTS 4,791,402 A * 12/1988 Vaughn .................... 340/468
4,816,968 A * 3/1989 Yamada ................ B60Q 1/28
362/268

(Continued)

Primary Examiner — Hargobind S Sawhney (57) ABSTRACT

A method and apparatus for a curved lighting fixture that is symmetric about a longitudinal axis of the curved lighting fixture. The curved lighting fixture includes end caps that are parallel to the longitudinal axis. Each end cap includes two mounting studs that secure the lighting fixture to mounting brackets, where a first mounting stud provides an axis of rotation for the lighting fixture and a second mounting stud facilitates the rotation. The two mounting studs do not enter into an interior portion of the lighting fixture so as to facilitate externally serviceable hardware. A bushing provides an external retention mechanism to retain the two mounting studs within each end cap.

18 Claims, 8 Drawing Sheets

Related U.S. Application Data (60) Provisional application No. 61/586,614, filed on Jan. 13, 2012.

(51) Int. Cl.
  *F21V 15/01* (2006.01)
  *F21V 21/30* (2006.01)
  *F21S 8/10* (2006.01)
  *F21V 29/507* (2015.01)
  *F21V 29/75* (2015.01)
  *F21V 29/76* (2015.01)
  *B60Q 1/00* (2006.01)
  *B60Q 1/06* (2006.01)
  *B60Q 1/26* (2006.01)
  *B60Q 1/04* (2006.01)
  *F21Y 115/10* (2016.01)

(56) References Cited

U.S. PATENT DOCUMENTS

| | | | |
|---|---|---|---|
| 4,920,460 A * | 4/1990 | Mori | B60Q 1/0035 362/496 |
| 5,188,445 A * | 2/1993 | Haun et al. | 362/542 |
| 5,309,277 A | 5/1994 | Deck | |
| 5,373,423 A * | 12/1994 | Liedtke | B60Q 1/26 362/268 |
| 5,373,426 A * | 12/1994 | O'Sullivan | 362/496 |
| 5,798,691 A * | 8/1998 | Tim Kao | 340/479 |
| 5,988,840 A * | 11/1999 | Wirtz | 362/513 |
| 6,190,026 B1 * | 2/2001 | Moore | 362/487 |
| 6,286,984 B1 * | 9/2001 | Berg | F21S 48/215 362/227 |
| 6,520,669 B1 * | 2/2003 | Chen et al. | 362/545 |
| 6,561,690 B2 | 5/2003 | Balestriero et al. | |
| 6,592,238 B2 | 7/2003 | Cleaver et al. | |
| 6,986,597 B2 * | 1/2006 | Elwell | 362/496 |
| 7,095,318 B1 * | 8/2006 | Bekhor | 340/485 |
| 7,163,320 B2 * | 1/2007 | Liu | 362/469 |
| 7,217,004 B2 | 5/2007 | Park et al. | |
| 7,695,164 B2 | 4/2010 | Berben et al. | |
| 7,726,845 B2 | 6/2010 | Zheng et al. | |
| 7,758,211 B2 | 7/2010 | Zheng et al. | |
| 7,806,560 B2 | 10/2010 | Schultz et al. | |
| 8,092,049 B2 | 1/2012 | Kinnune et al. | |
| 8,220,976 B2 | 7/2012 | Liu et al. | |
| 8,246,219 B2 | 8/2012 | Teng et al. | |
| 8,313,222 B2 | 11/2012 | Kinnune et al. | |
| 8,317,369 B2 | 11/2012 | McCanless | |
| 8,430,195 B2 * | 4/2013 | Jansen et al. | 180/69.2 |
| 8,591,057 B2 | 11/2013 | Kawabata et al. | |
| 8,888,306 B2 * | 11/2014 | Thomas et al. | 362/92 |
| 2004/0170017 A1 | 9/2004 | Zhan et al. | |
| 2008/0290357 A1 | 11/2008 | Lin et al. | |
| 2009/0323342 A1 | 12/2009 | Liu | |
| 2010/0073637 A1 | 3/2010 | Matsumoto et al. | |
| 2010/0091507 A1 | 4/2010 | Li et al. | |
| 2010/0328947 A1 | 12/2010 | Chang et al. | |
| 2011/0176297 A1 | 7/2011 | Hsia et al. | |
| 2011/0233568 A1 | 9/2011 | An et al. | |
| 2013/0107519 A1 | 5/2013 | Kim et al. | |
| 2014/0016313 A1 | 1/2014 | Adams | |
| 2014/0268771 A1 | 9/2014 | Heikman | |

* cited by examiner

LIGHT FIXTURE WITH CURVED FRAME

This application is a continuation-in-part of U.S. patent application Ser. No. 13/741,307, filed on Jan. 14, 2013, which claims the benefit of U.S. Provisional Application No. 61/586,614 filed on Jan. 13, 2012.

BACKGROUND OF THE INVENTION

Field of the Invention

The present invention relates to exterior vehicle lighting.

Discussion of the Prior Art

Prior art exterior vehicle lighting is limited in the manner by which light is distributed from the light source. For example, one prior art light source comprises one or more lights oriented in a plane and directing light in one direction and relying on diffusers or lenses to distribute light in directions other than the one direction. Based on the above limitations of the prior art, it would be preferable to improve the distribution of light.

SUMMARY OF THE INVENTION

It is an object of the invention to provide a lighting fixture for protecting and mounting an array of light sources such as Light Emitting Diode (LED) modules. The fixture includes a frame with a first surface that arcs or curves with an arc angle of between ten and fifty degrees and an arc length of between about ten to fifteen times the arc height. A plurality of LED modules including a lens and bonnet reflector are each functionally coupled against the first surface to direct a combination refracted and reflected beam pattern, the beam pattern of each LED module having a peak luminous intensity directed substantially normally from the first surface in front of and against which each LED module is functionally coupled. The peak luminous intensity of the combination refracted and reflected beam pattern associated with each LED module has a positive angle with respect to the combination refracted and reflected beam pattern from adjacently located LED modules.

The light fixture of the current invention fulfills the objective of producing a plurality of combination refracted and reflected beam patterns associated with each LED module and wherein each of the combination refracted and reflected beam patterns is directed substantially normal to the first surface of the frame behind and adjacent to each LED module. The resulting composite beam pattern comprised of the combination refracted and reflected beam pattern has a substantially uniform luminous intensity at angles within the arc angle of the fixture.

Objectives are fulfilled by the invention including the enhanced distribution of light from a combination beam light source without having to use a diffuser or a lens shape that also diminishes the intensity or brightness of a light source as it spreads or distributes light. Accordingly, the present invention is particularly useful as a spot light that distributes with equal intensity in a radial pattern.

DESCRIPTION OF THE INVENTION AND/OR EMBODIMENTS

Figure 1:
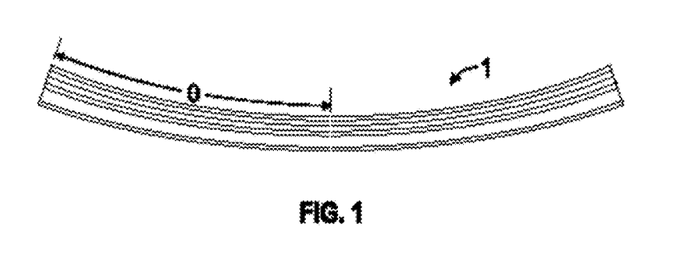
FIG. 1 illustrates a top view of an embodiment of the invention.

The invention comprises a curved frame for use as a lighting fixture for protecting and mounting a plurality of light sources on a vehicle or other transportation. FIG. 1 is a top view of a preferred curvature or arc angle "Θ" of the frame 1. An exemplary light source using the frame 1 includes an array of distinct light sources such as LED modules (not shown) oriented to direct and distribute light radially in a semi-circumferential pattern from the frame 1 in the direction of the arc. The LED modules may include at least one LED and at least one other LED module component such as a reflector, an LED driver, an LED lens, or an LED housing. A plurality of thermal fins 11 extend from the back of the curved backplane 131 to dissipate heat from the electronics within the frame 1.

Figure 2:
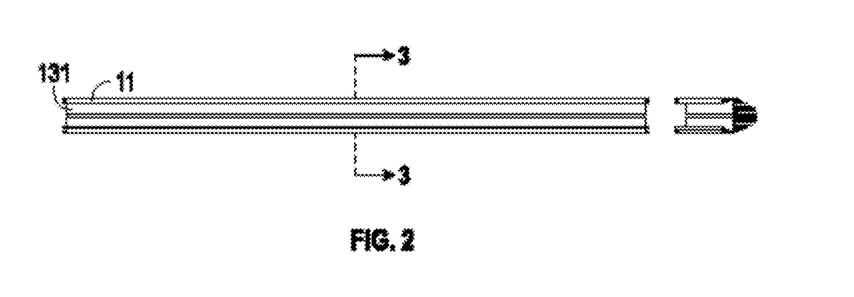
FIG. 2 illustrates a front view with a cutaway portion.

The frame 1 provides both structural support for the LED modules and thermal management. A preferred electronics frame is composed of metal and has a first side with a substantially smooth or planar surface and a second side with fins 111 for heat dissipation. FIG. 2 illustrates a front view of the frame 1 and the interior surface or curved backplane 131 against which the LED modules are coupled. LED modules are arranged in an array comprising one or more rows of LED modules coupled against the curved backplane 131.

Figure 3:
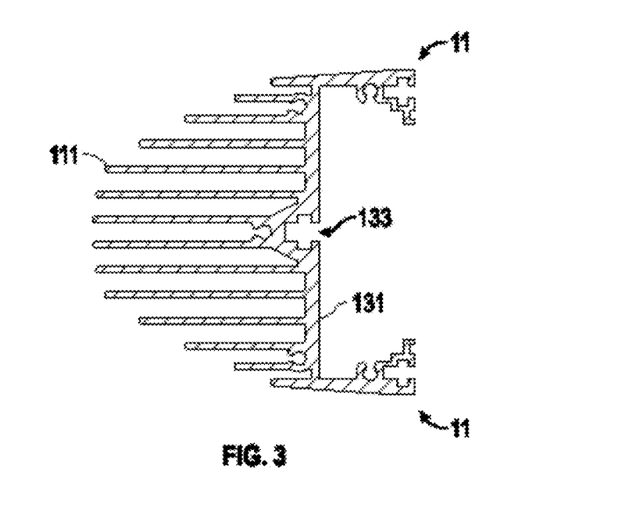
FIG. 3 illustrates a cross section.

FIG. 3 illustrates a cross section of the curved frame 1. A curved perimeter ridge 11 extends from either side of the curved backplane 131 for the length of the frame 1 and provides a cavity, channel or recess within which the LED modules are secured and protected. A protective lens (not shown) constructed from a sturdy and abrasion resistant material such as polycarbonate is mechanically coupled to the perimeter ridge 11 and defines a cavity within which the LED control electronics are secured and sets the lens off from the curved frame 1 and the LED modules within cavity defined by the curved backplane 131 and the curved perimeter ridge 11. The protective lens can be either clear or incorporate one or more lens designs to focus or collimate or diffuse or direct light in a desired direction from the frame 1.

The preferred curved backplane 131 includes a backplane trough 133 defined by at least one surface separated from, and substantially parallel to, the curved backplane 131 surface. The illustrated trough 133 is equidistant from either perimeter ridge 11 but can be offset from the center. The at least one surface of the backplane trough 133 is a biasing surface against which fasteners can bias for securing LED modules or circuit boards to the backplane 131. As illustrated in FIG. 3, the preferred backplane trough 133 as viewed from a cross section resembles a negative image of a "+" or "t" shape and comprises five surfaces substantially parallel to the curved backplane 131 and six surfaces substantially perpendicular to the curved backplane 131. Nut-type fasteners are slid into the trough from the ends of the frame 1 and oriented to be engaged by bolt or screw type fasteners from a direction substantially perpendicularly to the backplane 131 and engage and bias to secure circuit boards placed against the backplane 131.

Figure 4:
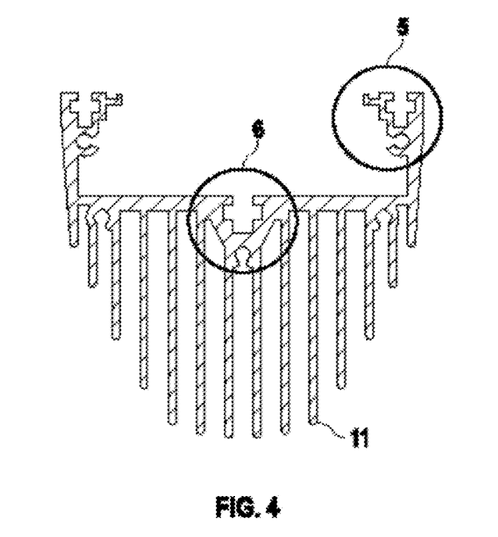
FIG. 4 illustrates a cross section with portions specified for detail in FIGS. 5 & 6.
Figure 5:
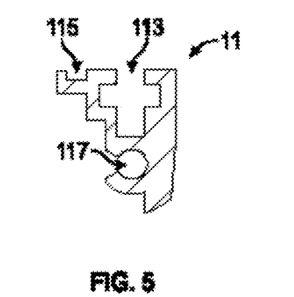
FIG. 5 illustrates detail from the perimeter ridge 1.
Figure 6:
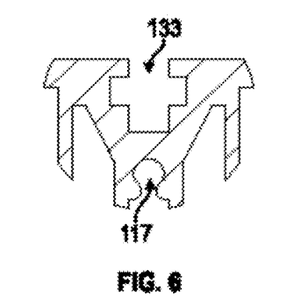
FIG. 6 illustrates detail from the backplane trough 133.

As illustrated in the cross sectional view of FIG. 4, the perimeter ridge 11 has a ridge height or longitudinal dimension between about one-half and one-fourth, and preferably about one-third of the height of the frame 1. A perimeter trough 113 is accessible beneath the top edge(s) of the perimeter ridge 11. As cross section of the perimeter trough 113 illustrated in FIG. 5 resembles a negative image of a "+" or "t" shape with five surfaces substantially parallel to the curved backplane 111 or top edge of the perimeter ridge 11 and six surfaces substantially perpendicular to the curved backplane 131 and top edges of the perimeter ridge 11. The preferred perimeter ridge 11 includes an O-ring channel 115 extending substantially perpendicularly from the perimeter ridge 11 towards the interior of the frame 1 and positioned adjacent the top edge of the perimeter ridge 11. The channel or trough 115 is adapted or sized to receive a rubber gasket or O-ring, which is compressed by the fixture lens mechanically coupled to the perimeter ridge 11 top edges by fasteners biased by the perimeter trough 113.

Figure 7:
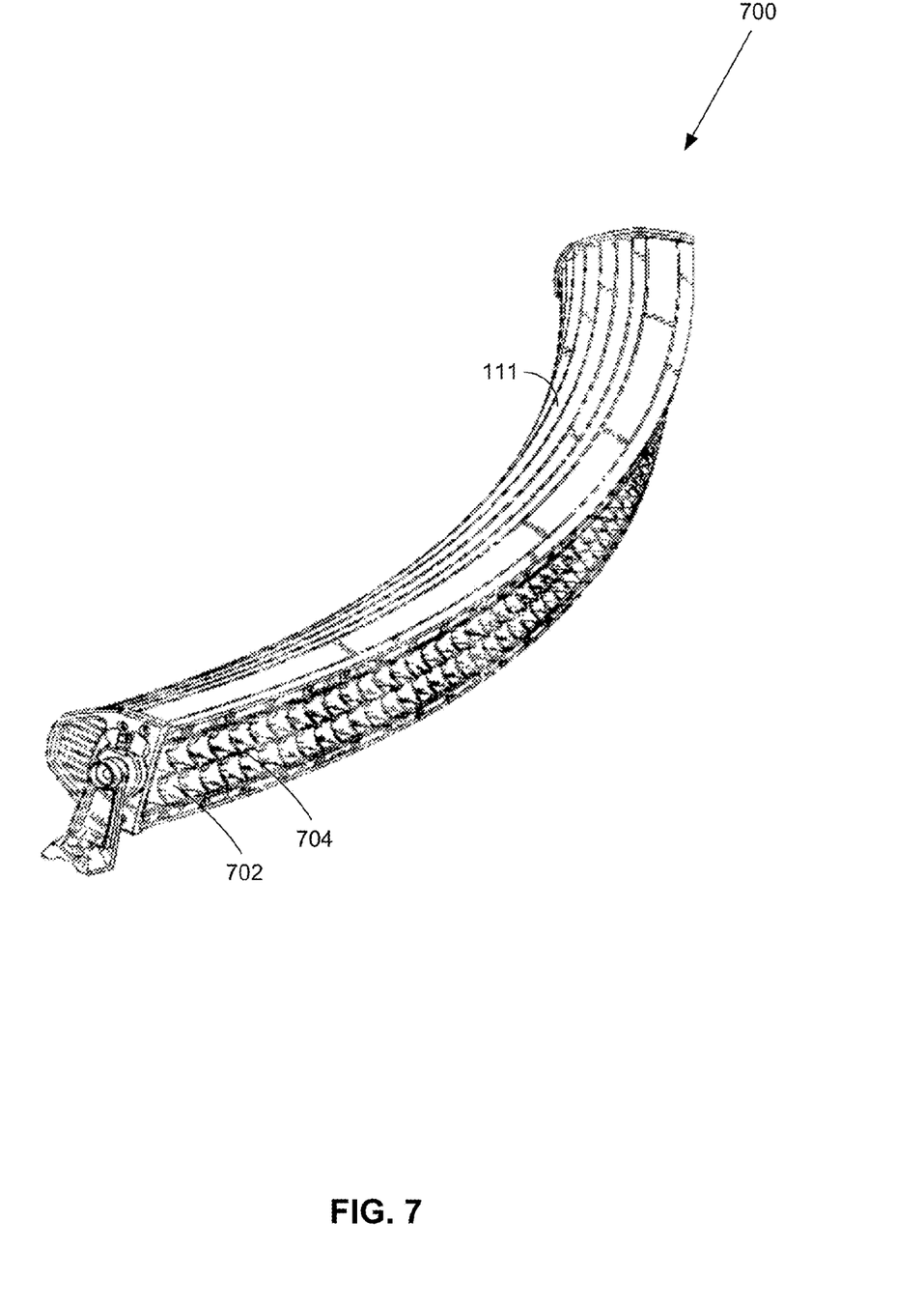
FIG. 7 illustrates an alternate embodiment of the invention.

In one example of use (e.g., as illustrated in FIG. 7), a plurality of LED modules may be securable to a backplane (e.g., backplane 131 of FIG. 3) in equal or unequal rows, with equal or unequal numbers of LED modules. In this example, the LED modules each include an LED (e.g., LED 704) with encapsulate to refract light into a Lambertian pattern and/or may optionally include a lens suspended above or adhered to the encapsulate to refract light into a refracted beam pattern. A bonnet type reflector (e.g., reflector 702) may be positioned adjacently and above each LED 704 creating a reflected beam into a reflected beam pattern. The bonnet type reflector 702 may be a curved concave shape and may be any shape that reflects light into a reflected beam pattern. The combination of the refracted beam pattern and reflected beam pattern from each LED module produces a combination refracted and reflected beam pattern directed away and substantially normally from the curved backplane 131 above or adjacent to which the LED module is positioned and secured. The plurality of LED modules produce a plurality of combination refracted and reflected beam patterns wherein each of the plurality of combination beam patterns is directed substantially normally from the curved backplane 131 above which each LED module is positioned and secured. Fins 111 exist, for example, to provide a heat sink to pull heat away from the LEDs (e.g., LED 704).

In another example, the plurality of LED modules omits either or both of the refracting lens or the reflecting lens. Still, the production of a plurality of beam patterns from each LED module is directed substantially normally to the backplane 131 to produce a light direction pattern correlated with the curvature of the backplane 131 of the frame 1. The beam pattern associated with each LED module creates a positive angle with respect to the beam pattern associated with LED modules adjacently located on the backplane 131. As a result, the light emitted from each LED module is cast at a positive angle with respect to the light emitted from adjacently located LED modules and the luminous intensity of light emitted from the frame 1 is substantially equivalent within the arc angle of the frame 1. The composite beam from the LED has a substantially consistent luminous intensity within the arc angle of the frame 1 as compared relative to a light fixture having a non-curved or substantially linear light fixture.

The illustrated frame 1 of FIG. 1 has a preferred arc angle "Θ" of between twenty degrees (20°) and forty five degrees (45°) and is preferably about thirty six degrees (36°) from one end of the frame 1 to the other. The frame 1 arc length is between about ten to fifteen times the arc height and preferably about twelve to thirteen times the arc height.

The electronics frame may be a die cast, die cast module, or made by extruding a radius light having the arc angle desired or extruding a straight or linear metal electronics frame, notching the fins in one or more places (to deter buckling of the metal fins), and bending or curving the frame to the desired curvature. Whether extruded or molded another preferred manner of constructing the frame 1 is by molding or extruding identical frame 1 segments having a curved dimension which are then fastened or secured together at the ends to create a completed frame 1 with the desired frame length and arc angle.

End caps (not shown) are secured to the ends of the frame 1 by inserting fasteners such as screws or bolts through the end caps and into fastener receptacles 117 such as screw holes or threaded bolt apertures. The illustrated embodiment shows the fastener receptacles 117 positioned substantially directly beneath the backplane trough 133 and the perimeter trough 113. The end caps are a unitary construction that are secured to the frame 1 ends include a mounting pivot such as a bolt extending substantially laterally from the frame and provide a mounting point for coupling the frame 1 to mounting hardware and access for the electrical conductor providing power to the interior of the fixture. To enclose the fixture, the end caps are secured to the frame 1 and the lens positioned across the frame 1. A plurality of longitudinally dimensioned rails (not shown) having a width substantially equivalent to the perimeter ridge are placed on top of the fixture lens and bolt type fasteners inserted into nuts positioned laterally in the perimeter trough 113 to engage the bolt type fasteners.

Figure 8:
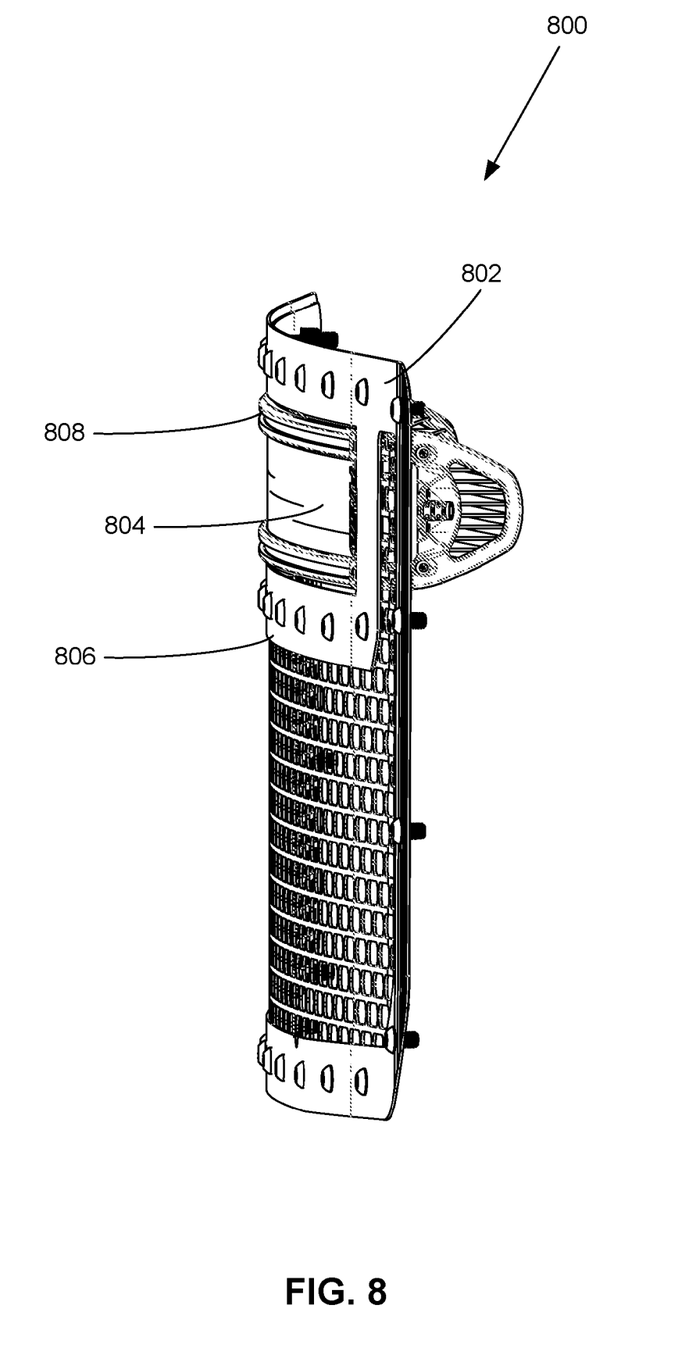
FIG. 8 illustrates an alternate embodiment of the invention.

Turning to FIG. 8, assembly 800 is illustrated which may include grille 802 and light fixture 804, where grille 802 may be an automotive grille disposed along a forward portion of an automobile (e.g., grille 802 may be disposed forward of a radiator of the automobile in the general vicinity that may be between the automobile's head lights). A length (e.g., circumference) of light fixture 804 may be equal to or less than a length (e.g., circumference) of grille 802.

Disposed within grille 802 may, for example, be light fixture 804 (e.g., light fixture 700 of FIG. 7). In one embodiment, the arc angle "Θ" of light fixture 804 may be substantially equal to the arc angle "φ" of grille 802, such that the radius of curvature of light fixture 804 and grille 802 yields a non-linear assembly (e.g., an assembly that exhibits a curved shape) having a substantially equal radius of curvature. Accordingly, for example, outward face 806 of grille 802 may be substantially co-planar with outward face 808 of light fixture 804 at all points along the arc of outward faces 806 and 808 as illustrated. As such, light fixture 804 may appear to be integrated within grille 802 since, for example, light fixture 804 may exhibit approximately the same radius of curvature of grille 802. In so doing, for example, discontinuities between automotive grilles and light fixtures that would otherwise exist when using substantially linear (e.g., non-radiused light fixtures) within substantially radiused grilles are eliminated when a radiused light fixture (e.g., light fixture 804) is integrated within a substantially similarly radiused grille (e.g., grille 802) as illustrated in FIG. 8.

Figure 9:
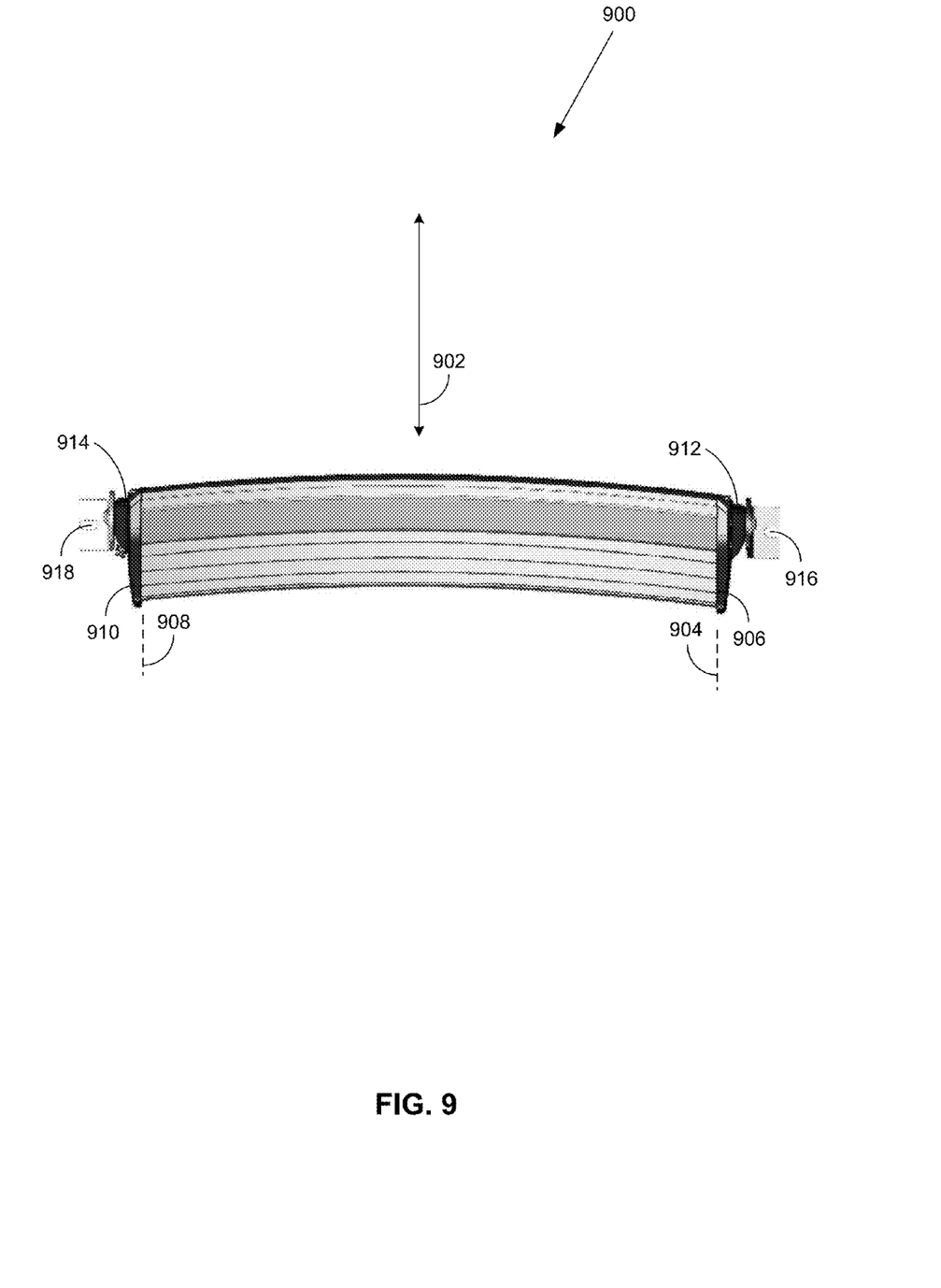
FIG. 9 illustrates an alternate embodiment of the invention.

Turning to FIG. 9, radiused lighting fixture 900 is illustrated from a top orthographic view of radiused lighting fixture 900. Radiused lighting fixture 900 may exhibit a radius of curvature that is non-linear (e.g., curved as shown) and whose radius of curvature may be symmetric about longitudinal axis 902. Ends 904 and 908 of radiused lighting fixture 900 may be substantially parallel to longitudinal axis 902. In one embodiment, longitudinal axis 902 is parallel to the longitudinal axis of the vehicle (not shown) upon which radiused lighting fixture 900 is mounted.

Since ends 904 and 908 of radiused lighting fixture 900 are substantially parallel to longitudinal axis 902, end caps 906 and 910, respectively, are also substantially parallel to longitudinal axis 902. Accordingly, radiused lighting fixture 900 may maintain an axis of rotation about pivot points 912 and 914 that is substantially orthogonal to longitudinal axis 902. In so doing, for example, radiused lighting fixture 900 may be rotated about pivot points 912 and 914 while radiused lighting fixture 900 is mounted to its respective mounting surface at mounting positions 916 and 918. Such rotational capability of radiused lighting fixture 900 may, for example, allow an angle of the light emanating from radiused lighting fixture 900 to be adjusted while radiused lighting fixture 900 is mounted to its respective mounting surface.

Figure 10:
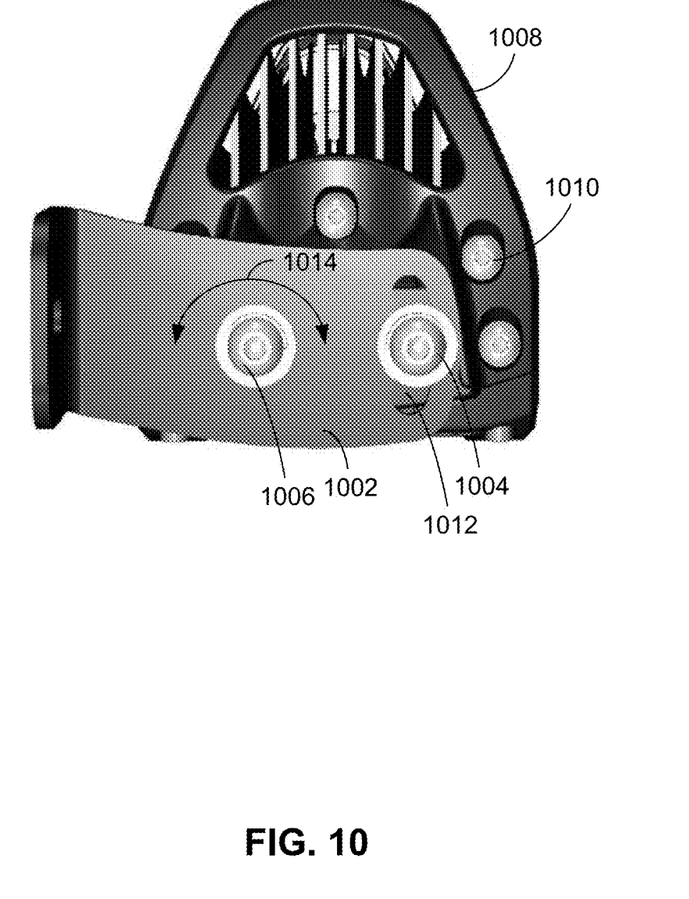
FIG. 10 illustrates mounting detail.

Turning to FIG. 10, mounting detail is illustrated that may include end cap 1008 and mounting bracket 1002 that may engage not one, but two mounting studs 1004 and 1006. End cap 1008 may, for example, be mounted to a lighting fixture (e.g., frame 1 of FIG. 1) via mounting hardware 1010. Mounting studs 1004 and 1006 may, for example, engage mounting bracket 1002 and may be utilized to increase the structural integrity of the mounting apparatus by providing two securing mechanisms (e.g., via studs 1004 and 1006) to mounting bracket 1002, instead of just one securing mechanism for added structural integrity. In addition, slot 1012 exists within mounting bracket 1002 to allow end cap 1008 (and therefore the lighting fixture attached to end cap 1008) to be rotated about an axis formed by mounting stud 1006 along direction 1014. In so doing, for example, the direction of light emanating from the lighting fixture may be altered by rotating the lighting fixture along direction 1014 while the lighting fixture remains mounted to its respective mounting surface via mounting bracket 1002.

Figure 11:
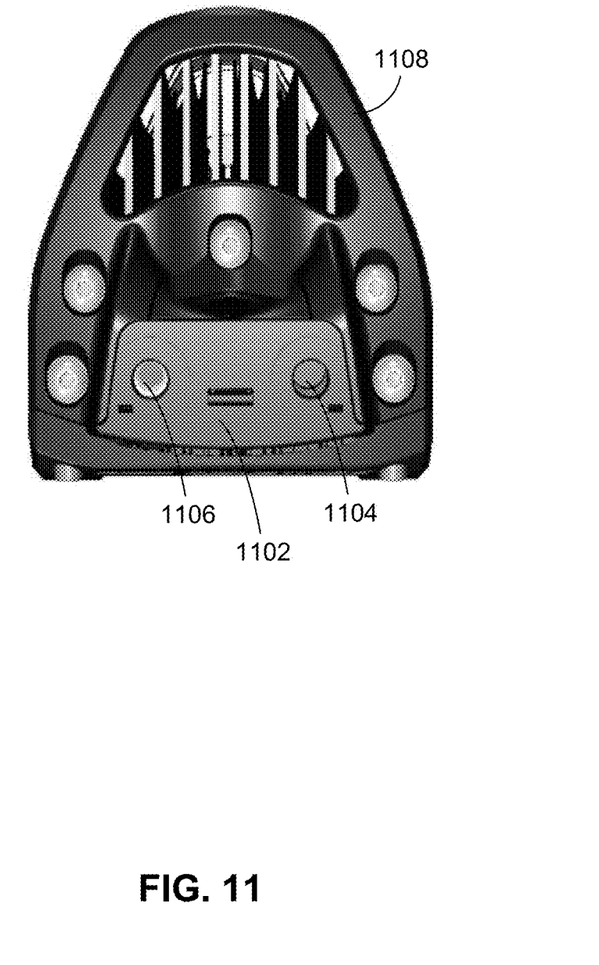
FIG. 11 illustrates mounting detail.

FIG. 11 is identical to FIG. 10, except that mounting bracket 1002 of FIG. 10 has been removed in order to illustrate bushing 1102. Bushing 1102 provides apertures (e.g., apertures 1104 and 1106) to allow passage of mounting studs (e.g., mounting studs 1004 and 1006 of FIG. 10) that may then be used to mount end cap 1108 (and the associated lighting fixture) to a mounting bracket (e.g., mounting bracket 1002 of FIG. 10). Bushing 1102 may, for example, serve at least two functions. First, bushing 1102 may act as the friction bushing necessary to mount the lighting fixture to a mounting bracket (e.g., mounting bracket 1002 of FIG. 10). Second, bushing 1102 may act as the retaining mechanism that may be necessary to retain the mounting studs (e.g., mounting studs 1004 and 1006 of FIG. 10) within end cap 1108. In one embodiment, bushing 1102 may itself be held within end cap 1108 by a friction fit, such that bushing 1102 may "snap" in and out of end cap 1108.

Figure 12:
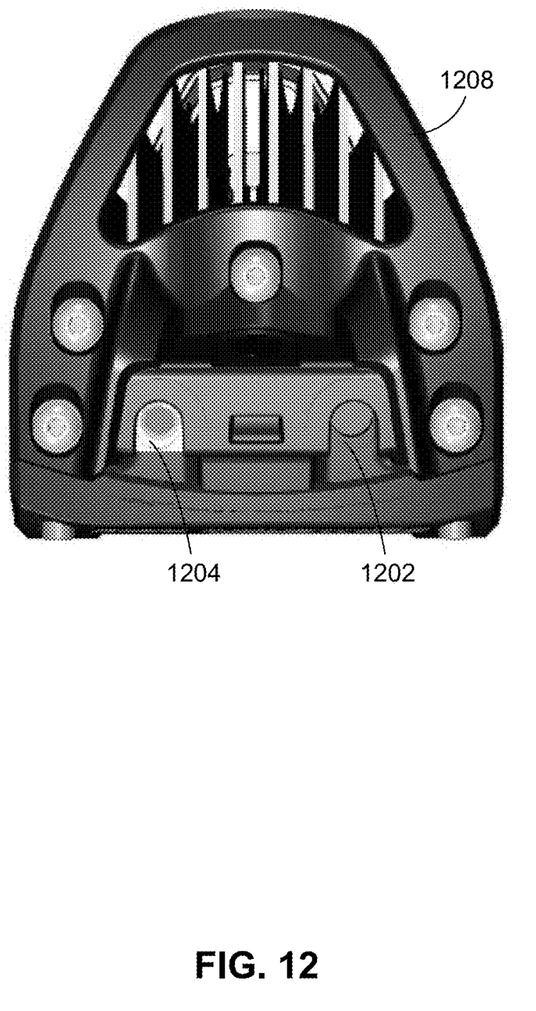
FIG. 12 illustrates mounting detail.

FIG. 12 is identical to FIG. 11, except that bushing 1102 has been removed to expose slots 1202 and 1204. Slots 1202 and 1204 are retaining slots that may be used to retain mounting studs (e.g., mounting studs 1004 and 1006 of FIG. 10) within end cap 1208. Slots 1202 and 1204 may be notched such that the head of the mounting studs (e.g., the head of a standard bolt or a captive nut attached to a standard bolt) may be slipped into the slot while the notch of each slot 1202 and 1204 may be used to prevent the mounting stud from rotating while other mounting hardware (e.g., nuts) are attached to the mounting studs. Slots 1202 and 1204, therefore, allows mounting hardware to be externally attached to the lighting fixture (e.g., mounting hardware is not attached anywhere internal to the lighting fixture) so as to allow the mounting hardware to be serviced externally from the lighting fixture.

As an example, lighting fixtures that provide a mounting stud protruding from an interior region of the lighting fixture must be disassembled for repair should the mounting stud be damaged for any reason. As illustrated in FIGS. 10-12, on the other hand, all mounting hardware may be serviced externally to the lighting fixture. Accordingly, any need to disassemble the lighting fixture in the event of a mounting hardware failure is obviated due to the external serviceability of the mounting hardware.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A lighting system, comprising:
   an automotive grille having a first radius of curvature; and
   a lighting fixture having a second radius of curvature substantially equal to the first radius of curvature, said lighting fixture including a frame having a curved shape along the length of the frame with a cavity formed therein and a light source positioned within the cavity, wherein the lighting fixture is disposed within the automotive grille.

2. The lighting system of claim 1, wherein an outer surface of the automotive grille is substantially co-planar with an outer surface of the lighting fixture.

3. The lighting system of claim 1, wherein a length of the automotive grille is longer than a length of the lighting fixture.

4. The lighting system of claim 1, wherein a length of the automotive grille is equal to a length of the lighting fixture.

5. The lighting system of claim 1, wherein the lighting fixture is an LED-based lighting fixture.

6. The lighting system of claim 1, wherein the lighting fixture further includes first and second end caps, at least one of the first and second end caps being coupled to the grille for mounting the lighting fixture within the grille.

7. The lighting system of claim 6, wherein said lighting fixture further includes first and second pivot points at the first and second end caps such that the lighting fixture has an axis of rotation about the first and second pivot points that is substantially orthogonal to a longitudinal axis.

8. The lighting system of claim 1, wherein the frame further includes a front surface and a back surface, said back surface having heat dissipating fins extending therefrom, and said front surface having a perimeter ridge extending therefrom for the length of the frame, thereby defining the cavity for containing the light source.

9. A lighting system, comprising:
   an automotive grille having a first radius of curvature; and
   a lighting fixture having a second radius of curvature substantially equal to the first radius of curvature, said lighting fixture including a frame having a curved shape along the length of the frame with a cavity formed therein and a light source positioned within the cavity, wherein the lighting fixture is integrated with the automotive grille.

10. The lighting system of claim 9, wherein an outer surface of the automotive grille is substantially co-planar with an outer surface of the lighting fixture.

11. The lighting system of claim 9, wherein a length of the automotive grille is longer than a length of the lighting fixture.

12. The lighting system of claim 9, wherein a length of the automotive grille is equal to a length of the lighting fixture.

13. The lighting system of claim 9, wherein the lighting fixture is an LED-based lighting fixture.

14. The lighting system of claim 9, wherein the lighting fixture is rotatable with respect to the automotive grille.

15. A lighting system, comprising:
 an automotive grille having a first radius of curvature; and
 a lighting fixture having a second radius of curvature substantially equal to the first radius of curvature, said lighting fixture including a frame having a curved shape along the length of the frame with a cavity formed therein and an LED light source positioned within the cavity, wherein the lighting fixture is coupled to the automotive grille.

16. The lighting system of claim 15, wherein an outer surface of the automotive grille is substantially co-planar with an outer surface of the lighting fixture.

17. The lighting system of claim 15, wherein a length of the automotive grille is longer than a length of the lighting fixture.

18. The lighting system of claim 15, wherein a length of the automotive grille is equal to a length of the lighting fixture.

* * * * *